United States Patent [19]

Pilkington et al.

[11] Patent Number: 4,633,912

[45] Date of Patent: Jan. 6, 1987

[54] HOSE CONSTRUCTION

[75] Inventors: Mervin V. Pilkington, Akron, Ohio; Robert W. Cole, Sun Prairie, Wis.; Robert C. Schisler, Akron, Ohio

[73] Assignee: The Goodyear Tire & Rubber Company, Akron, Ohio

[21] Appl. No.: 739,659

[22] Filed: May 31, 1985

[51] Int. Cl.$^4$ .............................................. F16L 11/08
[52] U.S. Cl. ..................... 138/132; 138/137; 138/141; 138/153; 138/DIG. 4; 138/DIG. 7; 156/143; 428/36; 428/522; 428/523
[58] Field of Search .............. 138/137, 141, 132, 153, 138/DIG. 4, DIG. 7; 156/143; 428/523, 522, 36

[56] References Cited

U.S. PATENT DOCUMENTS 3,266,527  8/1966  Ross .................................. 138/137
3,528,260  9/1970  Binder ................................ 138/137

Primary Examiner—Alexander S. Thomas
Attorney, Agent, or Firm—D. O. Nickey

[57] ABSTRACT

This invention is concerned with a hose construction particularly suitable for Freon service in refrigeration systems. The hose comprises (1) a core tube of polyamide covered by an elastomeric friction layer such as EPDM rubber having incorporated therein a calcium ion source and an adhesion system and a curative, (2) a layer of tensioned reinforcement strands, (3) an adhesive/barrier/friction layer such as an ethylene acrylic acid copolymer, (4) a second layer of tensioned reinforcement strands, and (5) a cover selected from chlorobutyl rubber or other suitable materials wherein the chlorobutyl rubber utilizes a bis-dienophile as a crosslinker.

17 Claims, No Drawings

HOSE CONSTRUCTION

TECHNICAL FIELD

This invention is concerned with a specific hose construction utilizing specific materials that is particularly suited for use in refrigeration systems, especially automobile air conditioning systems.

BACKGROUND ART

Hoses have been developed which are useful for Freon service in refrigeration and air conditioning systems, particularly to automobile air conditioners, wherein hoses or other suitable flexible conduit members are employed for the purpose of joining the principal operating components of the refrigerating device. These hoses should have good flexibility, high strength, the ability to bend to small radii without kinking, small outside diameter in relation to inside diameter and impermeability to the fluids involved. In addition, these refrigeration hoses are subjected to temperature extremes in under-the-hood applications, and further, must meet requirements for proper coupling attachment. Freon TM type fluoro-halo derivatives of aliphatic hydrocarbons are widely used in refrigeration devices because of their low toxicity and other suitable properties. However, the containment of these halogenated hydrocarbons within the refrigeration circuit has always been a problem. Hoses of conventional synthetic material such as nylon, polyvinyl chloride polymers and the like, although having characteristics suitable, are in most cases permeable to water vapor which makes them undesirable for refrigeration service. In the past, attempts have been made to solve the water vapor permeability problem by applying a covering of thin sheet material over the tube core. Such sheet material has been wrapped about the tube so as to result in a longitudinal seam or has been spirally wrapped with a resulting spiral seam and has been manufactured from such materials as Mylar TM, Teflon TM Saran TM and polypropylene.

The sheet material is not only difficult to apply to the core tube, but may also present problems in adhering to the core tube or surrounding reinforcement and in keeping the seam tight when the core tube expands and contracts during pressure variations or when the hose is bent or flexed. A particular problem involves hose constructions wherein the sheet materials impart an undesirable rigid character to the hose such that when the hose is bent or flexed, separation of the hose components results with attendant failure of the hose.

A major portion of air conditioner hose presently employed in automobile air conditioners is a three-layer structure. The innermost tubular layer of the hose is formed of an elastomeric material intended to keep the refrigerant fluid and compressor lubricant in the hose and moisture and air out. Since the refrigeration apparatus is subject to greater than atmospheric pressures by the refrigerant, a layer of reinforcing braiding is wound upon the outside surface of the inner tube. An outer layer of elastomer resistant to ozone, engine oil and other contaminating materials likely to be present in the engine compartment is typically extruded over the braided reinforcement. In hoses of this type, the inner layer is acrylonitrile-butadiene rubber or chlorosulfonated polyethylene, the braiding fibers may be rayon and other conventional fibers, and the outer layer is neoprene or EPDM.

Even though numerous refrigerant hose designs have been developed, they fail to combine low Freon permeability, low water permeability, flexibility, vibration resistance and good coupling properties to the hose over temperature extremes.

U.S. Pat. No. 805,848 discloses a hose comprising a core tube of polyamide coated with a vinylidene chloride polymer, a tensioned reinforcement and a sheath, the reinforcement being bonded to both the coating and the sheath.

U.S. Pat. No. 3,528,260 discloses and claims refrigerant hoses formed of a major proportion of crosslinked chlorinated polyethylene. This patent discloses that a mixture of about 85 to 90 parts by weight of crosslinked, chlorinated polyethylene with 10 to 15 parts by weight of a suitable cured elastomeric material such as acrylonitrile-butadiene rubber, chlorinated butyl rubber, neoprene, chlorosulfonated polyethylene or polyepichlorohydrin is also fairly impervious to Freons and has some of the other physical and chemical properties required for use as air conditioning hose.

U.S. Pat. No. 3,266,527 discloses a hose structure comprising a tubular core of flexible material, a helically wound strip of substantially impervious plastic material concentrically, constrictively surrounding said core, a flexible layer of reinforcing braid concentrically surrounding said sheath and a flexible protective tubular jacket concentrically surrounding said braid layer. This patent discloses that the core may be formed of a polyamide, a polyolefin or a polyvinylchloride material, the sheath being preferably formed of a suitably impervious plastic material such as polyethyleneterephthalate, polyvinylidene chloride-vinylchloride copolymer, FEP fluorocarbons and the like. The sheath materials disclosed comprise a heat shrinkable material which permits facilitated positive association thereof with the tubular core.

None of the prior art suggests or discloses a hose construction wherein (1) a polyamide core of a specific thickness has bonded to it an (2) elastomeric friction layer which comprises (a) a base polymer such as EPDM, (b) a source of calcium ions, (c) an adhesion system, and (d) a peroxide curative; which is on the outer surface of the core and adhered directly to it, (3) a layer of tensioned reinforcement strands cover the elastomeric friction layer, (4) an adhesive/ barrier friction layer comprising a natural or synthetic elastomer or ethylene acrylic acid copolymers between the first and second layers of tensioned reinforcement, and finally, (5) a cover, specifically a chlorobutyl rubber cover, which uses a bis-dienophile as a crosslinker. It has been discovered that this particular construction has excellent Freon and water impermeability, and further, provides the required flex, vibration resistance and coupling properties for utilization in automotive air conditioning systems.

DISCLOSURE OF THE INVENTION

There is disclosed a hose comprising: (1) a polyamide core: (2) an elastomeric friction layer wherein an adhesive system, a calcium ion source and a curative are present: (3) an adhesive/barrier/ friction layer; (4) a layer of reinforcement; and (5) a cover, said cover comprising chlorobutyl rubber which is crosslinked with a bis-dienophile.

There is further disclosed a hose comprising (1) a polyamide core; (2) an elastomeric friction layer wherein an adhesive system, a calcium ion source and a curative are present; (3) a spirally wrapped layer of reinforcement; (4) an adhesive/barrier/friction layer; (5) a second layer of spirally wrapped reinforcement; and (6) a cover.

There is also disclosed a hose comprising (1) a polyamide core; (2) an elastomeric friction layer comprising (a) a base polymer selected from EPDM's, copolymers of butadiene, polychloroprene, polybutadiene, polyisoprene or mixtures thereof, (b) a calcium ion source selected from the group comprising calcium stearate, calcium alkoxides of 1 to 10 carbon atoms, calcium hydroxide, calcium oxide and calcium carbonate, (c) a resorcinol or phenolic based adhesive system, and (d) a peroxide or sulfur curative; applied to the outer surface of the core and adhered directly thereto after curing (3) a first layer of reinforcement strands tensioned about the elastomeric friction layer; (4) an adhesive/barrier/friction layer comprising a compound selected from natural and synthetic elastomers and copolymers of ethylene and acrylic acid; (5) a second layer of reinforcement strands tensioned about the adhesive/barrier/friction layer; and (6) a halobutyl rubber cover wherein the halobutyl rubber contains a bis-dienophile as a crosslinker.

There is also disclosed a process for the preparation of a reinforced hose construction which comprises:
(a) forming a core tube of polyamide;
(b) applying a coating of polymer to the core tube, the coating being in a range of 0.1 mm to 2 mm, the coating comprising a base polymer, an adhesive system, a calcium ion source, and a curative for the base polymer;
(c) applying a fibrous reinforcement over the coated tube;
(d) applying a layer of an ethylene acrylic acid copolymer;
(e) applying a second layer of fibrous reinforcement over the ethylene acrylic acid copolymer;
(f) applying a halobutyl rubber cover over the second layer of reinforcement which contains a bis-dienophile crosslinker; and
(g) open steam curing the hose to result in a reinforced hose having excellent Freon and water impermeability.

There is also disclosed a process for the preparation of a multi-element hose, the improvement comprising the use of an elastomeric friction layer between the core tube and the reinforcement layer, said elastomeric friction layer comprising:
(a) a base stock selected from EPDM's, copolymers of butadiene, polychloroprene, polybutadiene, polyisoprene, or mixtures thereof;
(b) a calcium ion source;
(c) a resorcinol or phenolic based adhesive system; and
(d) a peroxide or sulfur curative.

Additionally, there is disclosed a hose comprising a tube, reinforcement, friction layers, and a cover, the improvement comprising the use of a halobutyl rubber cover which is crosslinked by a bis-dienophile selected from the group comprising bis-maleimide, alkyl acrylate, and 1,6-hexanediol dimethacrylate, which is open steam cured.

The tubular core of this invention may be formed from a polyamide plastic material. The core may be formed as by extruding. The thickness of this polyamide core is important, as excessively thin wall thicknesses or excessively thick wall thicknesses present flexibility or kinking problems or coupling compatibility problems of the final hose composite. It has been determined that for inside diameters of ⅝(1.59 cm) and 13/32 inches (1.03 cm), wall thicknesses of the polyamide core should be from 0.5 mm to 1.5 mm and will thus provide the required flexibility without kinking. One skilled in this art will appreciate that for other size inside diameter hoses, the wall thickness for the polyamide core may vary, yet still provide the necessary flex, Freon TM impermeability and freedom from kinking. It has been determined that a minimum wall thickness of about 0.018 inches (0.045 cm) is required to achieve satisfactory Freon impermeability and coupling integrity.

The term "nylon" as used herein is in its generic sense for any long-chain synthetic polymeric amides or superpolyamides, which have recurring amide groups as an integral part of the main polymer chain. Essentially, these polyamides are of two types, those which are made from diamines and diacids, and those which are made by the self-condensation of omega-amino acids such as omega-amino undecanoic acid. Normal nylon is made from hexamethylene diamine and adipic acid and may be used in accordance with the present invention. A similar polyamide is made from hexamethylene diamine and sebacic acid. Still another polyamide is made from eta-caprolactam which reacts by self-condensation mechanism as if it were eta-amino caproic acid. Still another variety is obtained from omega-amino undecanoic acid by self-condensation. Reference may be had to to Carothers U.S. Pat. No. 2,130,948 for additional examples of nylons, and to "Polymers and Resins" by Golding, 1959, pp. 314.

Representative of the commercially available polyamides useful in the core are Nylon 6 TM, Nylon 66 TM, Nylon 11 TM, and so on, and blends or copolymers thereof. These nylons may also be plasticized and are known in the art.

A most important and required aspect of the instant invention is the elastomeric friction layer which is preferably extruded onto the outer surface of the core which is adhered directly to it after curing. One skilled in this art will appreciate that the elastomeric friction layer may be applied in the form of a sheet either spirally wrapped or butt seamed. These methods of applying such layers are known in the art, and variations thereof are contemplated herein. The elastomeric friction layer comprises a base polymer selected from EPDM's, copolymers of butadiene, polychloroprene, polybutadiene, polyisoprene, or mixtures thereof. Representative of the base polymers useful in the elastomeric friction layer are polyisoprene, polybutadiene, copolymers of butadiene and acrylonitrile, copolymers of butadiene and styrene, polychloroprene, ethylene propylene copolymers, EPDM's such as ethylene propylene norbornene terpolymers, ethylene propylene-1,4-hexadiene terpolymers, ethylene propylene dicyclopentadiene terpolymers and the like. The most preferred base stock for the elastomeric friction layer is the ethylene propylene ethylidene norbornene terpolymers. The base polymer for the elastomeric friction layer must contain a calcium ion source, an adhesive system and a peroxide or sulfur curative. It has been determined that this elastomeric friction layer which contains calcium ions and an adhesive system provides the required flexibility to the hose and adherence to the polyamide core and reinforcement.

The source of calcium ions used in the elastomeric friction layer can be obtained from calcium salts of organic acids such as calcium stearate, calcium oxide, calcium alkoxides such as calcium methoxide, calcium hydroxide, calcium carbonate and the like. It is believed that any compound that would provide the $Ca^{++}$ion in the elastomeric friction stock would be appropriate and would provide the enhanced adhesion of the friction layer to the polyamide core and the reinforcing strands. The amount of calcium ion source present in the elastomeric friction layer per 100 parts of base polymer can range from 0.1 to 15 parts by weight with 0.1 to 5 parts by weight being more preferred. One skilled in this art will appreciate that depending on the source of the $Ca^{++}$ion, the amount of material added will depend on its molecular weight and ionization potentials. Thus, 1 part by weight of calcium oxide (CaO) will provide stoichiometrically 10 times the number of $Ca^{++}$ions that calcium stearate will; and therefore, adjustments within the skill of the artisan are contemplated herein. The calcium ion source is usually added directly to the base stock and mixed up to about 149° C. in the nonproductive mix.

The adhesive systems useful in this invention are the conventionally known resorcinol or phenolic based adhesive systems. The resorcinol component may be added to the elastomeric friction layer compound in the nonproductive mix, or preformed adhesive resins may be added during the productive mix. Thus, the resorcinol may be added to the base stock during the nonproductive mix, and the co-reactant such as hexamethylmelamine (hemel) would be added during the productive mix. Useful co-reactants with the resorcinol are hexakis(methoxymethyl)melamine, hexamethylenetetramine, and compounds of such a nature. When a prereacted adhesive resin is used, it is mixed with the base stock during the productive stage. Representative prereacted adhesive resins are Schenectady Chemical, Inc.'s heat-reactive phenolic resins such as SP-12 TM, SP-25 TM and SP-103 TM. Schenectady Chemical's heat-reactive resorcinol resins such as SRF-1501 TM and SRF-1523 TM have also been found suitable.

The amount of adhesive system utilized in the elastomeric friction layer can range from 1 to 10 parts by weight based on 100 parts of base stock polymer. The preferred adhesive system is a 60/40 resorcinol stearic acid blend and hexakis(methoxymethyl)melamine.

Those skilled in this art will realize that incorporation of silica is required to retard the reaction of the resorcinol and the co-reactant to achieve adhesive characteristics. The amounts and types of silica are within the skill of the artisan.

The peroxide or sulfur curatives useful in the elastomeric friction layer are those that are normally used in such base stocks. For example peroxides such as dicumyl peroxide, [α,α'-bis(t-butylperoxide)diisopropylbenzene], benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t-butylperoxy)hexyne-3, and n-butyl 4,4-bis(t-butylperoxy)valerate. The most preferred and commercially available peroxide curatives are Percadox TM 14/40 from Noury Chemical Corporation and Vul-Cup TM from Penwalt Corporation a α,α'-[bis(t-butylperoxy)diisopropylbenzene]. From 1 to about 5 parts of peroxide or sulfur are utilized based on 100 parts of base polymer. Most preferably, the peroxides are used since they are less sensitive to premature resin formation.

The tensioned reinforcement strands are preferably spirally wound about the elastomeric friction layer under sufficient tension to improve the strength of the hose structure. The reinforcement layer is preferably spirally wrapped at angles such that flexing of the hose will not result in collapse or kinking. An angle such as 52° to 56° with respect to the center line of the hose has been found acceptable. Most preferably, a neutral angle of 54°44' or below has been found advantageous for the spiral wraps. For more information, see "Hose Technology" by Collin W. Evans, 2nd Ed., Applied Science Publishers. Also contemplated within the scope of the present invention are braided reinforcements.

Between the first and second layers of the tensioned reinforcement strands is placed an adhesive/barrier/friction layer which comprises a compound selected from natural and synthetic elastomers, and most preferably, ethylene acrylic acid copolymers. It has been determined that enhanced water impermeability can be imparted to the hose construction when an ethylene acrylic acid copolymer is placed between the reinforcement strands. Primacore TM, an adhesive polymer from the Dow Chemical Company, is produced by the free radical, high pressure copolymerization of ethylene and acrylic acid. The comonomer, acrylic acid, content can range from about 5 up to 15 percent by weight. This low melt index adhesive polymer can be extruded onto the first reinforcing layer, and subsequently, the second spiral wrapped reinforcing layer can be placed in intimate contact with the ethylene acrylic acid copolymer so that upon curing said ethylene acrylic acid copolymer acts as an adhesive between the first and second spiral wraps, and in addition thereto, provides additional water vapor impermeability.

After the second layer of reinforcement strands have been installed as essentially described above for the first layer of reinforcement, a cover selected from halobutyl rubber or other suitable materials is placed on the outside of the hose construction. Preferably, a halobutyl rubber such as chlorobutyl, which utilizes a bis-dienophile as a crosslinker has been discovered to provide a cover with enhanced abrasion, ozone, chemical and vapor permeability resistance and heat aging. It has been noted that dramatic increases in crosslinking efficiencies are obtained when bis-dienophiles are used in zinc oxide curing recipes for halobutyl rubbers. In addition, the use of the bis-dienophile curative gives compression set values that are appropriate for retaining the coupling.

It is known that chlorobutyl rubber has the lowest water permeation rate of the common synthetic elastomers, and is used as the cover compound by numerous hose manufacturers. Chlorobutyl is used in press cured applications because compression set values are severely affected by open steam curing. The cure technology disclosed herein has been found to have open steam cured compression set values far superior to all previous open cured chlorobutyl compounds. This feature is important since failure of the coupling will occur if the rubber does not have low compression set values or cold flow resistance. Low compression set, cold flow resistance and good compression modulus over a wide temperature range are part of the benefits realized when using an open steam cured bis-dienophile crosslinked halobutyl rubber as the cover in the instant invention.

The cure mechanism is believed to proceed through reaction of zinc oxide with a chlorine on the polymer creating a conjugated diene group which reacts with a difunctional unsaturated bis-dienophile such as a dimaleimide, thus crosslinking the polymer. This reaction can be catalyzed or accelerated by a tertiary amine such as a thiuram or dithiocarbamate. Primary or secondary amines will work, but are suspected to be unstable in steam cures producing erratic results.

A class of dienophiles useful in the crosslinking of the halobutyl rubber cover are generally any organic compounds containing at least two N-substituted maleimide radicals. The maleimide group is represented by the structural formula:

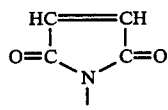

Also contemplated by the invention are the multimaleimides of the formulae:

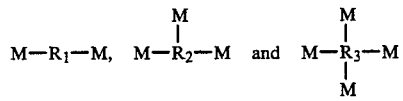

wherein M represents the maleimide group, $R_1$ is a divalent organic or inorganic radical, $R_2$ is a trivalent organic or inorganic radical, $R_3$ is a tetravalent organic or inorganic radical. For more information, see U.S. Pat. No. 3,334,075.

Other bis-dienophile crosslinkers useful in curing the halobutyl cover are the acrylates such as allyl acrylate, 1,4-butanediol diacrylate, 1,6-hexandiol dimethacrylate, pentaerythritol, tetraacrylate, trimethylpropane triacrylate and so on.

After construction of the hose as described above, the hose is open steam cured which provides good compression set values to the cured halobutyl cover.

Chlorobutyl rubber is usually press cured because compression set values are severely affected by open steam curing. Prior art processes use a thermoplastic curing sheath or lead sheaths to press cure the hose to obtain good compression set. Obviously, the additional steps of applying the curing sheath and its subsequent removal entail additional manpower and expense. Open steam curing wherein the hose structure to be cured is pressurized and placed on an open tray in an autoclave requires less manpower and energy to achieve the same state of vulcanization. The compression set values for these bis-dienophile/open steam cured hoses are far superior to all previous open steam cured halobutyl compounds.

Covers other than the halobutyl covers are contemplated herein, and numerous compounds such as EPDM, neoprene and Hypalon TM that are known in the art can be used as the cover for the hose construction of the instant invention.

The cover thickness may range from 0.1 cm to 0.5 cm with a thickness of about 0.15 cm being preferred.

The following examples are provided to illustrate the instant invention and are not intended to limit the same. All parts are parts by weight, unless listed otherwise.

BEST MODE OF THE INVENTION

A hose according to this invention is generally constructed by initially extruding a tube of suitable dimensions of the polyamide. Over the tube is extruded the elastomeric friction layer upon which is wrapped a layer of reinforcement. The adhesive/barrier/friction layer is then extruded over the reinforcement, and then the second layer of reinforcement is applied. The cover is applied through extrusion, and then the hose is pressurized with air during vulcanization in an autoclave.

The hose is then removed from the autoclave, inspected, tested and then cut into usable lengths. An appropriate coupling is then attached to the hose using known technology. The hose assembly is then installed in an automobile for the conveyance of Freon in the air conditioning system.

EXAMPLE I

A tube of 1.63 cm inside diameter of a Zytel TM nylon blend was extruded. The nominal outside diameter of this core tube was 18.39 mm and had a gauge thickness of 1.07 mm. The compressible friction layer was an ethylene propylene norbornene terpolymer obtained from Uniroyal, Inc. having incorporated therein 3 parts by weight of calcium stearate per 100 parts of terpolymer and 5 parts by weight of a 60/40 resorcinol/stearic acid blend. Seven parts by weight of hexakis(methoxymethyl)melamine was added during the productive mix. Seven parts of a 40% $\alpha,\alpha'$-bis(t-butylperoxy)diisopropylbenzene on clay (Vulcup 40KE TM) was added as the peroxide curative.

Table 1 sets out a representative compounding recipe for the elastomeric friction layer using a peroxide and a sulfur curative system for an EPDM base stock.

TABLE I

Representative Elastomeric Friction Layers

| Ingredient | Peroxide | Sulfur Curative |
|---|---|---|
| Non-Productive Mix | | |
| EPDM | 100 | 100 |
| Zinc Stearate | — | 1.0 |
| Ca. Stearate | 3.0 | 2.0 |
| Silica | 110 | 80 |
| ZnO | 15 | 15 |
| Oil | 50 | 50 |
| Methacryloxy Silane | 2.0 | — |
| Antioxidant | 1.0 | 1.0 |
| Cotton Fiber | — | 8.0 |
| Productive Mix | | |
| Resorcinol/Stearic Acid | 5.0 | 5.0 |
| Hexamethoxymelamine | 7.70 | 5.0 |
| Peroxide | 7.0 | — |
| MBTS | — | 3 |
| Zn dithiocarbamate | — | 1.5 |
| Methyl tuads | — | .8 |
| Sulfasan R TM | — | .8 |
| Sulfur | — | .5 |

EPDM/ethylene vinyl alcohol blends were also used as the base stock and compounded generally as above except CaO and CaOH were used as the calcium ion source.

The elastomeric friction layer was then extruded over the nylon core tube at a thickness of 0.024 inches (0.06 cm). The first spiral wrap was a polyester yarn having a gauge of approximately 0.03 cm. The yarn was wrapped at an angle of 53.3° with respect to the center line of the hose based on the mean diameter of the first layer of reinforcement. The actual effective angle is 54.4° with respect to the mean diameter of the two layers of reinforcement. Those skilled in the art will appreciate that a neutral angle or less would be appropriate to achieve good properties. Primacore TM 3330 (an ethylene acrylic acid copolymer wherein the acrylic acid content is 9 parts per 100 parts of ethylene) was extruded onto the first spiral reinforcement. The second spiral reinforcement of polyester fiber was spirally wrapped at an angle of 55.2° with respect to the mean diameter of the second layer of reinforcement. The cover was extruded onto the second spiral at a thickness and consisted of a chlorobutyl rubber containing 3 parts by weight of the bis-dienophile, bis-maleimide and 3 parts of a 90% dispersion of zinc oxide in napthenic oil.

Table II sets out a representative recipe for the halobutyl rubber cover using bis-maleimide as the crosslinker.

TABLE II

| Ingredient | Parts by Weight |
|---|---|
| Non-Productive Mix | |
| Chlorobutyl Rubber | 100.0 |
| Antioxidant | 1.0 |
| Stearic Acid | 1.0 |
| Carbon Black | 50.0 |
| Oil | 10.0 |
| Productive Mix | |
| ZnO Dispersion | 3.0 |
| Bis-maleimide | 3.0 |
| Methyl tuads | .5 |

The green hose was then open steam cured at 154° C. at 63 psig (about 4.36 kg/m ) for 1 hour.

EXAMPLES II-IV

Three other hose constructions according to the invention were made according to the procedure described in Example I, except that the wall gauges of the nylon tube and cover were varied, as were the inside diameter of the hoses. Table I sets out the variables for each construction.

| | Hose # | | | |
|---|---|---|---|---|
| | 1 | 2 | 3 | 4 |
| I.D. | 1.63 cm | 1.63 cm | 1.07 cm | 1.63 cm |
| Tube Wall Thickness | 1.07 mm | 0.81 mm | 0.81 mm | 1.07 mm |
| Cover Wall Thickness | 1.5 mm | 1.5 mm | 1.78 mm | 2.03 mm |

These four hose constructions according to the invention had appropriate fittings attached to them, and they were evaluated in a thermocycling test against three controls.

The controls were: Control 1— a commercially available 1.63 cm I.D. Hypalor TM tube, rayon braided reinforced, with an EPDM cover, marketed under the name of GY-4780A by The Goodyear Tire & Rubber Company.

Control 2 was similar to Control 1 except the tube and cover contained a lower percentage of elastomer. This hose was commercially marketed as a Freon hose under the name GY-4780 by The Goodyear Tire & Rubber Company.

Control 3 was a Parker Hannifin Corporation Freon hose marketed under the name Parflex TM 80 having a nylon core and a halobutyl cover. This hose is presently the major Freon hose used by the General Motors Corporation for use in automobile air conditioning systems.

This hose differs from the instant invention in that it does not contain an elastomeric friction layer, but bonds the braided nylon reinforcement directly to the nylon tube through the use of a rigid adhesive.

The four experimental hoses and the three control hoses were evaluated in a thermocycling test. This test procedure consists of an environmental chamber capable of from −26° C. (−15° F.) to 121° C. (250° F.) containing an inlet for pressurized Freon and couplings for the hose assemblies. The static assembly is installed in the chamber, and the temperature is lowered to −26° C. (-15° F.), held there for 15 minutes, and then the temperature is raised to 121° C. (250° F.) in about 1 hour. The temperature is held at 121° C. (250° F.) for 4 hours, and then the temperature is dropped again to −26° C. (−15° F.) in about 2 hours and held there for about 15 minutes. The hose assembly is then checked for leaks with a halo leak detector, and if no leaks are detected, the cycle is restarted by heating to 121° C. (250° F.). The number of cycles required to detect a leak is then recorded.

The data from the evaluation of experimental hoses 1-4, and controls 1-3 is set out in Table III.

TABLE III

| | Thermocycling Test Data | | | | | | |
|---|---|---|---|---|---|---|---|
| | Hose No. | | | | Control No. | | |
| | 1 | 2 | 3 | 4 | 1 | 2 | 3 |
| No. of Cycles Until Failure | 22 | 40+* | 14 | 30 | 10** | 1 | 13–14** |

*Sample removed without failure.
**Average of multiple runs.

From this data it is evident that hoses according to the instant invention are superior in this test compared to Freon hoses presently accepted in the industry.

Other hoses were constructed according to this invention wherein the wall gauge of the nylon core was varied, the type of nylon (blends) was varied, the adhesive/barrier/friction layer was varied in that SBR and EPDM's were utilized, and the covering was varied as to its composition and thickness.

The wall gauge test indicated that an increase in wall gauge of the nylon tube increased kink resistance and decreased flexibility. The Freon permeability changed very little over changing wall thickness. As to the type of nylon used; as the percentage of plasticizer in the nylon increased, the Freon permeability increased, and adhesion to the elastomeric friction layer decreased.

As the adhesive/barrier/friction layer went from Primacore TM to SBR to EPDM, adhesion to the reinforcement decreased.

For the cover, chlorobutyl rubber was superior to EPDM in resisting water penetration, and as the wall thickness of the chlorobutyl rubber cover increased, so did its impermeability to water. As the cover wall gauge is increased, so is the kink resistance, and most importantly, so did the fitting compatibility.

The thermocycling test which is a procedure which involves the cooling and heating of the vulcanized hose under extreme temperature and pressure conditions. At 121° C. 250° F.), the internal pressure ranged from 689.5 kPa (100–150 psig), and at −26° C. (−15° F.), the pressure internal on the hose was approximately 68.9 kPa (10 psig). This hose structure has been found to possess superior permeability characteristics and excellent resistance to collapse or kinking. Further, the hose according to this invention has excellent flexibility and hose coupling properties. In addition, the hose of the instant invention has been found to effectively prevent the Freon from permeating the structure while at the same time affording minimum permeability to water vapor. The hose of this invention also has the capability of operating at relatively high temperatures such as up to 120° C. and extremely low temperatures such as −20° C. in a dynamic condition and still retain the desired properties.

INDUSTRIAL APPLICABILITY

The automobile industry is constantly in search of air conditioning hoses that keep the Freon in, the water out, have good cold temperature flex, high temperature stability, good coupling properties and good flexibility without kinking or crushing. The hose construction of this invention, through synergistic activity of its component parts, achieves all these goals with reasonably priced materials and construction labor.

While we have shown and described embodiments of our invention, it is to be understood that it is capable of many modifications. Changes therefore in the the construction and particulars may be made without departing from the scope of the invention as defined and claimed.

What is claimed is:

1. A hose comprising: (1) a polyamide core; (2) an elastomeric friction layer comprising (a) a base polymer selected from EPDM's, copolymers of butadiene, polychloroprene, polybutadiene, polyisoprene or mixtures thereof, (b) a calcium ion source selected from the group comprising calcium stearate, calcium alkoxides of 1 to 10 carbon atoms, calcium hydroxide, calcium oxide and calcium carbonate, (c) a resorcinol or phenolic based adhesive system, and (d) a peroxide or sulfur curative; applied to the outer surface of the core and adhered directly thereto after curing; (3) a first layer of reinforcement strands tensioned about the elastomeric friction layer; (4) an adhesive/ barrier/friction layer comprising a compound selected from natural and synthetic elastomers and copolymers of ethylene and acrylic acid; (5) a second layer of reinforcement strands tensioned about the adhesive/ barrier/friction layer; and (6) a halobutyl rubber cover wherein the halobutyl rubber contains a bis-dienophile as a crosslinker.

2. A hose according to claim 1 wherein the elastomeric friction layer base polymer is an ethylene propylene norbornene terpolymer, the calcium ion source is calcium stearate, the adhesive system is resorcinol hexakis(methoxymethyl)melamine, the adhesive/barrier/friction layer is an ethylene acrylic acid copolymer, the cover is chlorobutyl rubber and the bis-dienophile is bis-maleimide.

3. A hose according to claim 1 wherein the calcium ion source is calcium oxide, the reinforcement is polyester, and the cover is chlorobutyl rubber.

4. A hose according to claim 1 wherein the reinforcement is spirally wrapped at an angle of 52° to 56° with respect to the center line of the hose and the adhesive/barrier/friction layer is a copolymer of ethylene and acrylic acid wherein the percent of acrylic acid can range from 5 to 15 by weight.

5. A hose according to claim 1 wherein the wall thickness of the polyamide core is from 0.5 mm to 1.5 mm.

6. A hose according to claim 1 wherein the wall thickness of the polyamide core is from 0.75 mm to 1.25 mm.

7. A hose according to claim 1 wherein the wall thickness of the polyamide core is from 0.90 mm to 1.10 mm.

8. A hose according to claim 1 wherein the curative for the elastomeric friction layer is $\alpha,\alpha$ -bis(t-butylperoxy)diisopropylbenzene.

9. A hose according to claim 1 wherein the elastomeric friction layer is extruded over the tube at a thickness of from 0.05 mm to 0.1 mm.

10. A hose according to claim 1 which is open steam cured.

11. A hose according to claim 1 wherein the reinforcement strand is selected from the group comprising polyester, rayon, aramid, polyamide and polyvinylalcohol.

12. A process for the preparation of a reinforced hose construction which comprises;
    (a) forming a core tube of polyamide:
    (b) applying a coating of polymer to the core tube, the coating being in a range of 0.1 mm to 2 mm, the coating comprising a base polymer, an adhesive system, a calcium ion source, and a curative for the base polymer;
    (c) applying a fibrous reinforcement over the coated tube;
    (d) applying a layer of an ethylene acrylic acid copolymer;
    (e) applying a second layer of fibrous reinforcement over the ethylene acrylic acid copolymer;
    (f) applying a halobutyl rubber cover over the second layer of reinforcement which contains a bis-dienophile crosslinker; and
    (g) open steam curing the hose to result in a reinforced hose having excellent Freon and water impermeability.

13. A process according to claim 12 wherein the base polymer is an ethylene propylene norbornene terpolymer, the calcium ion source is selected from the group consisting of calcium stearate, calcium oxide and calcium hydroxide.

14. A process according to claim 12 wherein the fibrous reinforcement is polyester yarn.

15. A process according to claim 4 wherein the curative is a peroxide curative and the ethylene acrylic acid copolymer contains 5-15% by weight of acrylic acid.

16. A process according to claim 12 wherein the cover is chlorobutyl rubber and the bis-dienophile crosslinker is bis-maleimide.

17. A multi-element hose, the improvement comprising the use of an elastomeric friction layer between the core tube and the reinforcement layer, said elastomeric friction layer comprising:
    (a) a base stock selected from EPDM's, copolymers of butadiene, polychloroprene, polybutadiene, polysioprene, or mixtures thereof;
    (b) a calcium ion source;
    (c) a resorcinol or phenolic based adhesive system; and
    (d) a peroxide or sulfur curative.

* * * * *

UNITED STATES PATENT AND TRADEMARK OFFICE
CERTIFICATE OF CORRECTION

PATENT NO. : 4,633,912

DATED : January 6, 1987

INVENTOR(S) : Pilkington et al

It is certified that error appears in the above-identified patent and that said Letters Patent is hereby corrected as shown below:

At Col. 9, line 55, delete the term "Hypalor" and insert therefor --Hypalon--.

At Col. 12, line 49, delete "4" and insert therefor --12--.

Signed and Sealed this

First Day of December, 1987

Attest:

DONALD J. QUIGG

Attesting Officer

Commissioner of Patents and Trademarks